United States Patent [19]
Fuller et al.

[11] Patent Number: 5,961,656
[45] Date of Patent: *Oct. 5, 1999

[54] METHOD AND APPARATUS FOR TESTING MEMORY DEVICES UNDER LOAD

[75] Inventors: Billy J. Fuller; Thomas G. Whitten, both of Colorado Springs, Colo.

[73] Assignee: Sun Microsystems, Inc., Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/551,117

[22] Filed: Oct. 31, 1995

[51] Int. Cl.⁶ .............................. G11C 29/00; G11C 7/00
[52] U.S. Cl. ..................... 714/718; 714/719; 714/763; 360/53; 365/201; 395/185.07
[58] Field of Search ................................. 371/21.2, 21.3, 371/40.1; 395/182.04, 185.07; 714/718, 719, 763; 360/53; 365/201

[56] References Cited

U.S. PATENT DOCUMENTS

| | | | |
|---|---|---|---|
| 5,212,784 | 5/1993 | Sparks | 395/575 |
| 5,588,007 | 12/1996 | Ma | 360/53 |
| 5,592,618 | 1/1997 | Micka et al. | 395/185 |
| 5,615,329 | 3/1997 | Kern et al. | 395/182 |
| 5,668,764 | 9/1997 | Surlekar | 365/201 |

*Primary Examiner*—Emmanuel L. Moise
*Attorney, Agent, or Firm*—Richard A. Bachand; William J. Kubida; Holland & Hart LLP

[57] ABSTRACT

A method for verifying a desired operation of an untrusted memory device is performed under load and includes shadowing read and write operations to the untrusted memory device and to a trusted memory device. The shadowing is performed by concurrently writing data to both the trusted and untrusted memory devices, and concurrently reading data from both the trusted and the untrusted memory devices. All data returned from the trusted and untrusted memory devices in response to the read operations are compared, and if any data compared does not have a same value, a value from the trusted memory device is returned and an error indication is generated.

16 Claims, 4 Drawing Sheets

METHOD AND APPARATUS FOR TESTING MEMORY DEVICES UNDER LOAD

BACKGROUND OF THE INVENTION

1. Field of the Invention

This invention relates to improvements in testing methods and apparatuses, and more particularly to improvements in methods and apparatuses for testing disk devices, memory devices, or the like.

2. Background Information

This invention is directed to data processing equipment, hardware, and software that includes a "memory device" as a part of its operation, which may be in conjunction with a general distributed computing system, or similar system, herein referred to as a "computing system". Such memory devices may include, for example, hard disk drives, logical volumes, dynamic memories, dynamic memories in which a software package may reside or be placed for execution, software packages that are executed from a dynamic memory, and so on. Such equipment of the type to which this invention pertains are referred to herein simply as "memory devices", although it will be appreciated that this collective term is being used in a general sense. It should be also noted that as a part of the operation of such memory devices, the data applied to the memory media as input data may or may not be modified during the operation of the memory device. Thus, for example, the memory device in a simple form may be merely a hard drive or hard drive emulator. In a more complex form, the memory device may include multiple media that exchange and operate on input data to provide programmed outputs. In still another form, the memory device may be a software package, some or all of which may be operated from a storage media that returns data values according to a predetermined criteria. General examples of such packages include complex logical volumes, such as mirrors, stripes, redundant arrays of inexpensive disks (RAIDs), and logging file systems. Other examples will be readily apparent to those skilled in the art.

As new memory device products or computer or computing system hardware are developed and introduced, frequently existing computer or computing system installations are modified by the addition of such new products. However, even though manufacturers generally perform exhaustive tests on such memory devices to assure that they perform as anticipated, when the memory devices are actually installed in a production system in its intended operating environment, herein referred to as "under load", many times the operating system setups and environments cause the data storage medium to operate in unintended and unanticipated ways. Thus, although the storage medium or software application may have been tested in many respects by its manufacturer, many unknown influences may affect whether the device operates properly when it is installed on a computing system that is in its normal operating environment, or under load.

As a result, often when a new memory device or software application that is operated in a memory device is added to a computer system, the integrity of the new memory device or software application in the new environment is not totally established. In a worst case, a defective memory device can not only return erroneous data, but an improperly operating memory device may actually cause existing data or other information in the existing system to be corrupted or destroyed. Moreover, the fact that the memory device is not working as intended may not be readily apparent to a user until after an unpropitious result has been obtained.

Some types of storage media include internal parts that operate invisibly to an external observer. An example is a device that appears as a single disk drive, but which has several internal disk drives that interact in a predefined manner, such as a device that performs logging using collections of disk devices. One of the problems that is sometimes encountered is that in the normal operation of the device, one part operates to modify the contents or operation of another part. If the device is malfunctioning, it is possible for the device to modify itself or its contents incorrectly, but from the outside the operation appears normal. Sometimes, in fact, the normal accessing routines might not access all parts or areas of the device, and some areas that may be modified do not produce an output which would indicate a malfunction. To test the operation of such a device, therefore, it would be desirable to be enabled to place the part under load, or in its normal operating environment, and to systematically read the contents of the device independently of its operation of receiving write operations and delivering read operations and compare the read information to a list of desired information.

What is needed, therefore, is a method or apparatus for testing such memory device under load in a manner that is "safe" with regard to the operating system with which it is associated.

SUMMARY OF THE INVENTION

In light of the above, therefore, and in accordance with a broad aspect of the invention, a method for operating a computing system is presented. The method is intended, in one embodiment, to test an untrusted memory device, and includes operating the computing system in a normal load environment so that the untrusted memory device is operated under actual operating conditions. The method includes concurrently reading and comparing data from both a trusted and the untrusted memory device, and generating an error indication if the data read from the trusted and untrusted memory devices are different. The output from the trusted memory device is used in operating the computing system, so the integrity of the computing system operation is not affected by the accuracy of the untrusted memory device.

The method may also include concurrently writing data to the trusted and untrusted memory devices prior to the reading step, wherein the accuracy of the memory device in recording or processing data written to the memory device is also verified.

In one embodiment, the method also includes providing a background test in which predetermined contents of the untrusted memory device are compared with desired values for the predetermined contents, and if the comparison indicates a difference, generating an error indication.

According to another broad aspect of the invention, a method for verifying a desired operation of an untrusted memory device under load is presented. The computing system may be operated in a normal operating environment to provide the load under which the verifying procedure is performed. The method includes shadowing all read and write operations to and from the untrusted memory device to a trusted memory device. The step of shadowing the read and write operations may include concurrently writing data to both the trusted and untrusted memory devices, and concurrently reading data from both the trusted and the untrusted memory devices. All of the data returned from the trusted and untrusted memory device in the read operations are compared, and if any data compared does not have the same value, a value is returned from the trusted memory device and an error indication is generated.

According to yet another broad aspect of the invention, a computer program product is presented. The product has a computer useable medium with computer readable code embodied therein for causing an untrusted memory device to be verified. The computer program product includes computer readable program code devices configured to cause a computer to effect a concurrent read operation from both the untrusted memory device and a trusted memory device. In some embodiments, the product may include computer readable program code devices configured to cause a computer to effect a concurrent write operation to write data to the trusted and the untrusted memory device prior to the reading. Additionally, the product has computer readable program code devices configured to cause a computer to effect an error indicating function if data read from the untrusted and trusted memory device differ.

In some applications, the computer program product may also have computer readable program code devices configured to cause a computer to effect a concurrent write to the untrusted and trusted memory device. In other applications, the product may have computer readable program code devices configured to cause a computer to effect an application of a control signal concurrently to the trusted memory device and the untrusted memory device, computer readable program code devices configured to cause a computer to effect a comparison of a status signal returned from the untrusted memory device with a status signal returned from the trusted memory device in response to the control signal, and computer readable program code devices configured to cause a computer to effect a generation of an error indication if the status signal returned from the untrusted memory device and the status signal returned from the trusted memory device in response to the control signal differ.

In yet other embodiments, the product may include computer readable program code devices configured to cause a computer to effect a background test for comparing predetermined contents of the untested memory device with desired values for the predetermined contents and to provide an error indication if the predetermined contents of the untested memory device differ from desired values for the predetermined contents.

According to still another broad aspect of the invention, a computer system for operation in a normal operating environment is presented. The computer system includes a shadowing device to duplicate all read and write operations to an untrusted memory device and to a trusted memory device. A comparator compares all data returned from the trusted and untrusted memory device in the read operations and generates an error signal if the data returned from the trusted and untrusted memory device in the read operations differ. An error reporter reports an occurrence of an error in response to the error signal from the comparator, and returns the data returned from the trusted memory device to the computer system.

The shadowing device may include a write driver to concurrently write data to the trusted and untrusted memory devices, and a read driver to concurrently read data from the trusted and the untrusted memory devices. In addition, the computer system may include a control signal driver to concurrently deliver control signals to the trusted and untrusted memory devices, and a status comparator to receive and compare status signals returned from the trusted and the untrusted memory devices and for generating a status error signal if the status signals returned from the trusted and untrusted memory devices in response to the control signals differ. The error reporter may additionally report occurrences of errors in response to the status error signal from the status comparator, and return the status signal returned from the trusted memory device to the computer system.

BRIEF DESCRIPTION OF THE DRAWINGS

The aforementioned and other features and advantages of the present invention and the manner of attaining them will become more apparent, and the invention itself will be best understood by reference to the following description of a preferred embodiment taken in conjunction with the accompanying drawings, wherein.

In the various figures of the drawings, like reference numerals are used to denote like or similar parts.

DETAILED DESCRIPTION OF A PREFERRED EMBODIMENT

The operating environment in which the present invention is used encompasses a general distributed computing system, wherein general purpose computers, workstations, personal computers, or the like may be connected via communication links of various types, in a client-server arrangement, and wherein programs and data, many in the form of objects, may be made available by various members of the system for access and execution by other members of the system.

Figure 1:
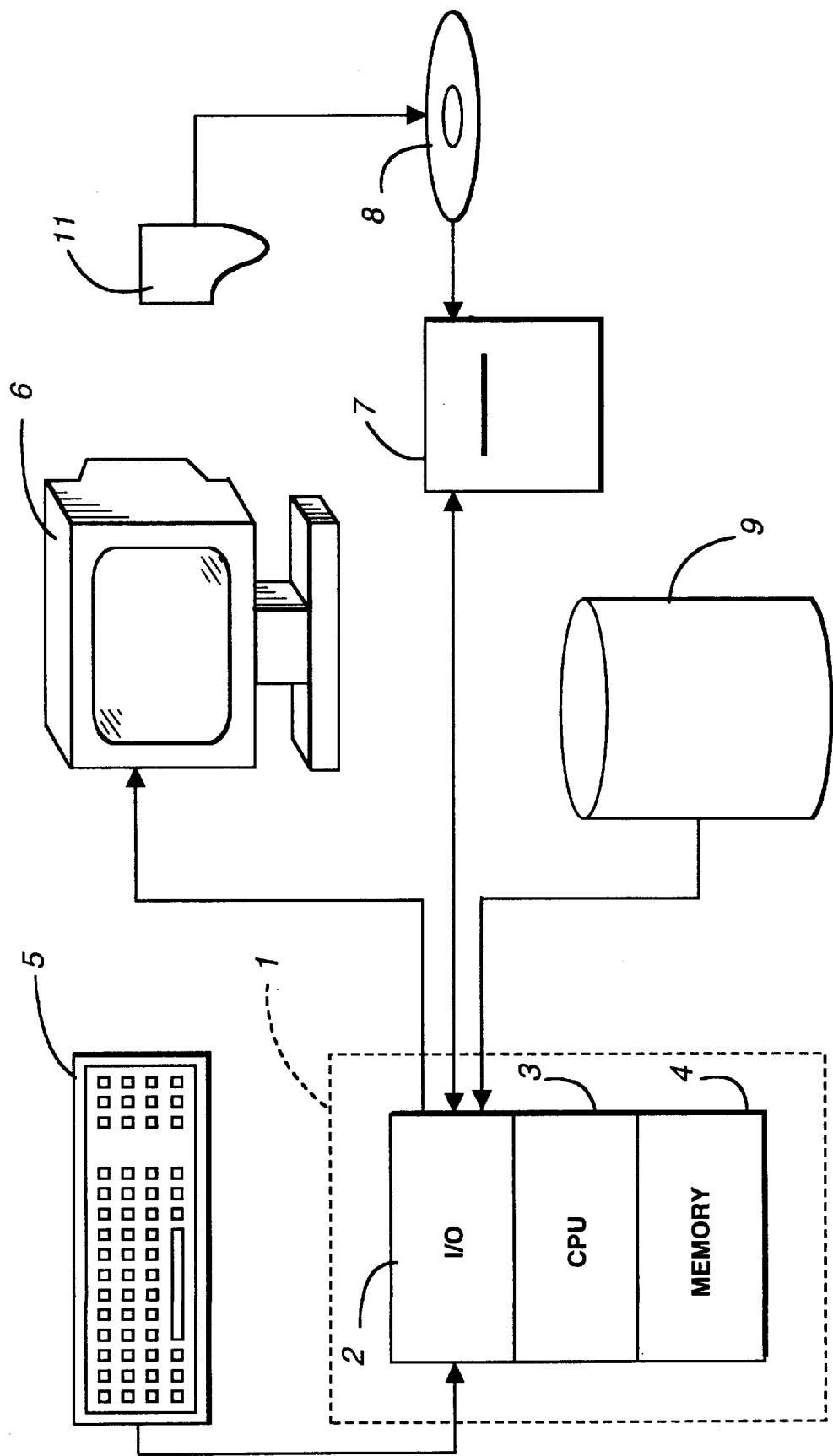
FIG. 1 is a box diagram illustrating a typical operating environment in which the method of the invention may be practiced.

Some of the elements of a general purpose workstation of the type with which the present invention may be used are shown in FIG. 1, wherein a processor 1 is shown, having an input/output ("I/O") section 2, a central processing unit ("CPU") 3 and a memory section 4. The I/O section 2 is connected to a keyboard 5, a display unit 6, a disk storage 9, and a compact disk ready only memory (CD-ROM) drive unit 7. The CD-ROM drive unit 7 can read a CD-ROM medium 8, which typically contains programs 11 and data. The computer program products containing mechanisms to effectuate the apparatus and methods of the present invention may reside in the memory section 4, on the disk storage unit 9, or on the CD-ROM medium 8 of such a system.

A preferred embodiment of the invention provides an apparatus and method that can be performed in an operating system having a trusted memory device in which the operation of an untrusted memory device can be tested or verified under load without jeopardizing the integrity of the information or data of the existing computing system. Additionally, the invention provides a method for operating a computing system in which a background test may be performed in which predetermined contents of the untrusted memory device are compared with desired values for the predetermined contents, and an error indication is generated if the comparison indicates a difference therebetween.

Figure 2:
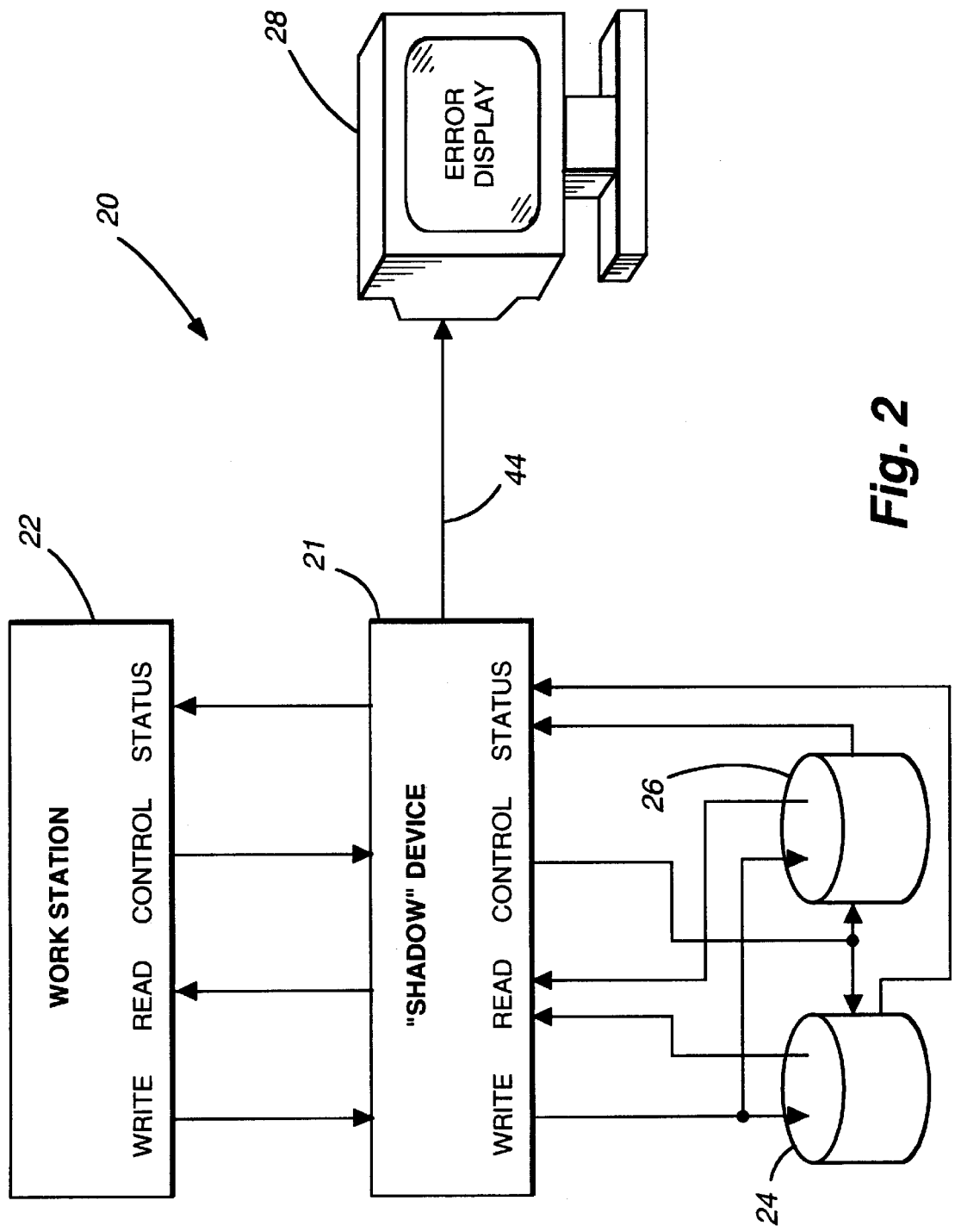
FIG. 2 is a block diagram illustrating a typical installation of a shadow driver device, according to a preferred embodiment of the invention, between a computing workstation, a trusted memory device, and an untrusted memory device.

More particularly, with reference now to FIG. 2, a block diagram illustrating a computing system 20 is shown. It should be understood that in a normal operating environment, only an existing memory device might be used in conjunction with the computer system 20, the existing memory device being referred to herein as a "trusted memory device" 24, since the functions and behavior of the existing device are determined and known in the working environment. It should also be noted that since the computer system 20 is being operated in its normal operating environment, the memory devices that are associated with the system are being operated "under load", experiencing the normal operating demands made thereupon in the normal operating environment.

The computing system 20 includes a workstation 22, and a "shadow" driver device 21, according to a preferred embodiment of the invention. When the addition of a new memory device is desired, the shadow driver 21 provides a path through which the new memory device 26 is operated in association with the workstation 22. As mentioned above, such memory devices may include, for example, hard disk drives, logical volumes, dynamic memories, dynamic memories in which a software package may reside or be placed for execution, software packages that are executed from a dynamic memory, or other device having a memory function to or from which data information can be written or read.

As shown, a shadow device function 21 is interposed between the workstation 22, the trusted memory device 24, and the new memory device 26. The new memory device 26 is referred to herein as an "untrusted memory device", since its operation under load has not yet been established. As can be seen, the write data stream is connected to both the trusted memory device 24 and the untrusted memory device 26, so that data is concurrently written to both devices. It will be appreciated that, although not absolutely necessary, by concurrently writing data to the trusted and the untrusted memory devices prior to subsequent reading steps, the accuracy of the new memory device 26 in recording or processing data written to it can be verified.

In addition, read request commands are concurrently directed to both the trusted memory device 24 and the untrusted memory device 26, and data is concurrently read from the trusted memory device 24 and untrusted memory device 26, in response to the read request commands. The data that has been read from the trusted memory device 24 and the untrusted memory device 26 is compared, and, if the untrusted memory device 26 is operating properly, the data should be the same. If, however, the shadow device 21 determines that the data read from the trusted memory device 24 and the untrusted memory device 26 are not the same, an output error report is generated, for example, for display on a cathode ray tube (CRT) device 28, or in another operator readable form.

In addition to the read and write data streams, control and status signals also may be concurrently applied to and received from both the trusted memory device 24 and the untrusted memory device 26. The returned status signals may also be compared, as below described, and if they are not the same, any differences are reported as errors.

One of the features of the shadow device 21 is that since any data or status information read from the untrusted memory device 26 may be unreliable, any data or status information returned to the workstation 22 are derived only from the trusted memory device 24. Thus, even though the integrity of the untrusted memory device has not yet been established, the operation and integrity of the overall computing system 20 is not compromised.

Figure 3:
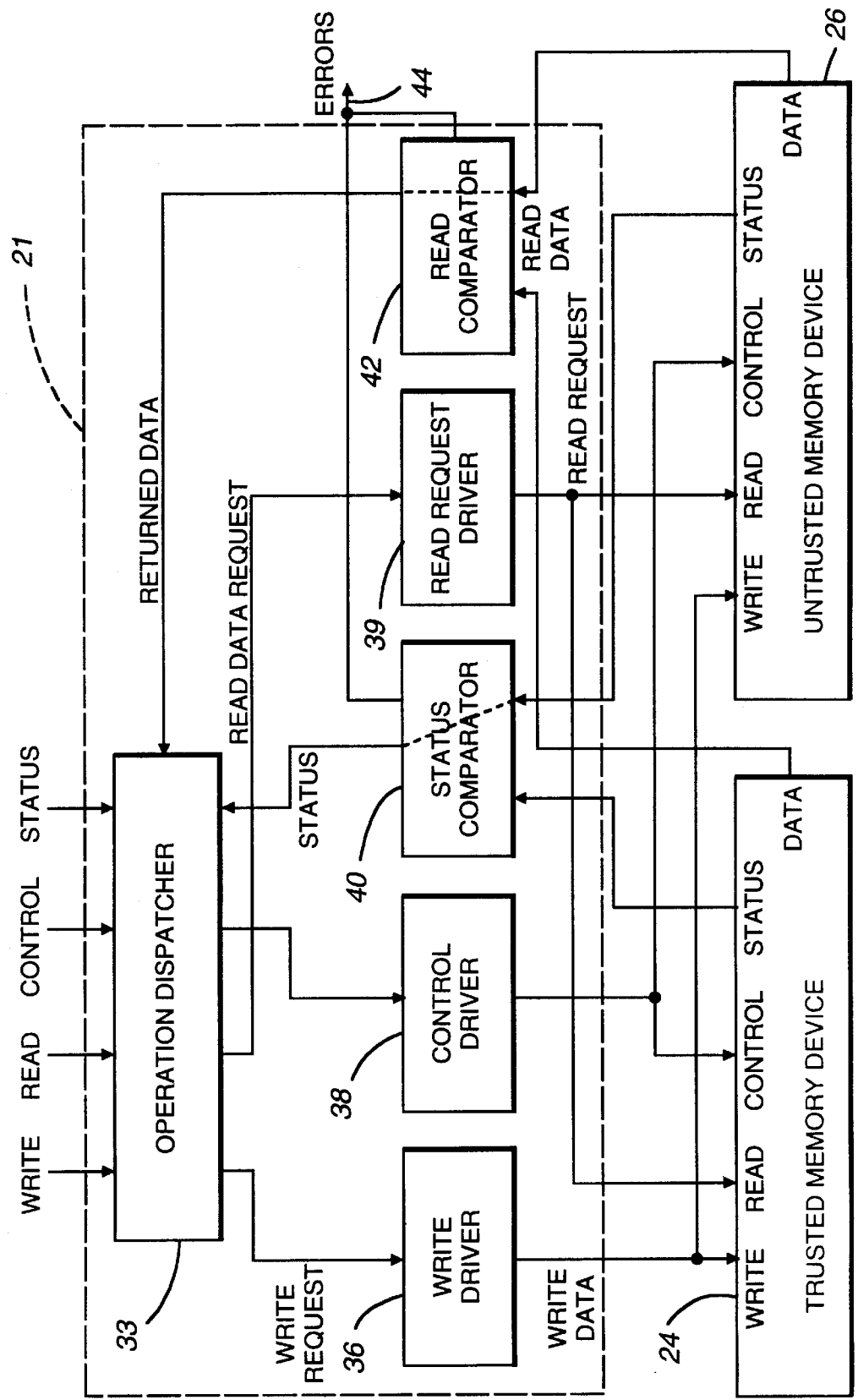
FIG. 3 is a box diagram showing the interrelationship of the operational features of the shadow driver device of FIG. 2.

Additional details of the shadow driver device 21 are shown in the box diagram of FIG. 3. It should be noted that although the various functions denoted by the various boxes in FIG. 3 may be implemented in hardware or hard-wired circuitry, preferably, the various functions are implemented by software programming within the workstation 22. Thus, preferably, the workstation 22 includes a computer useable medium having computer readable code embodied therein for causing the various functions herein described to be executed, including computer readable program code devices configured to cause a computer to effect the various specific functions herein described.

More particularly, the write, read, control, and status lines are connected from the workstation 22 to an operation dispatcher 33 within the shadow driver device 21. The operation dispatcher 33 serves to direct the write, control, and read request signals received from the workstation 22 respectively to a write driver 36, a control driver 38, and a read request driver 39. The operation dispatcher 33 also serves to receive status signals and output data streams developed by reading the trusted memory device 24 and untrusted memory device 26 and deliver them back to the workstation 22.

The status signals and output data streams developed by the trusted memory device 24 and untrusted memory device 26, however, before being delivered to the workstation 22 are first compared, respectively, by a status comparator 40 and a read comparator 42. If the compared signals differ, an error output is reported on output line 44. In any event, as shown by the dotted lines within the status comparator box 40 and read comparator box 42, only the outputs from the trusted memory device 24 are delivered back to the operation dispatcher 33 for delivery to the workstation 22. Consequently, as mentioned above, the fact that the untrusted memory device 26 is in operation simultaneously with the trusted memory device 24 will not deleteriously affect the operation or reliability of the workstation 22 with which the memory devices 24 and 26 are associated.

Figure 4:
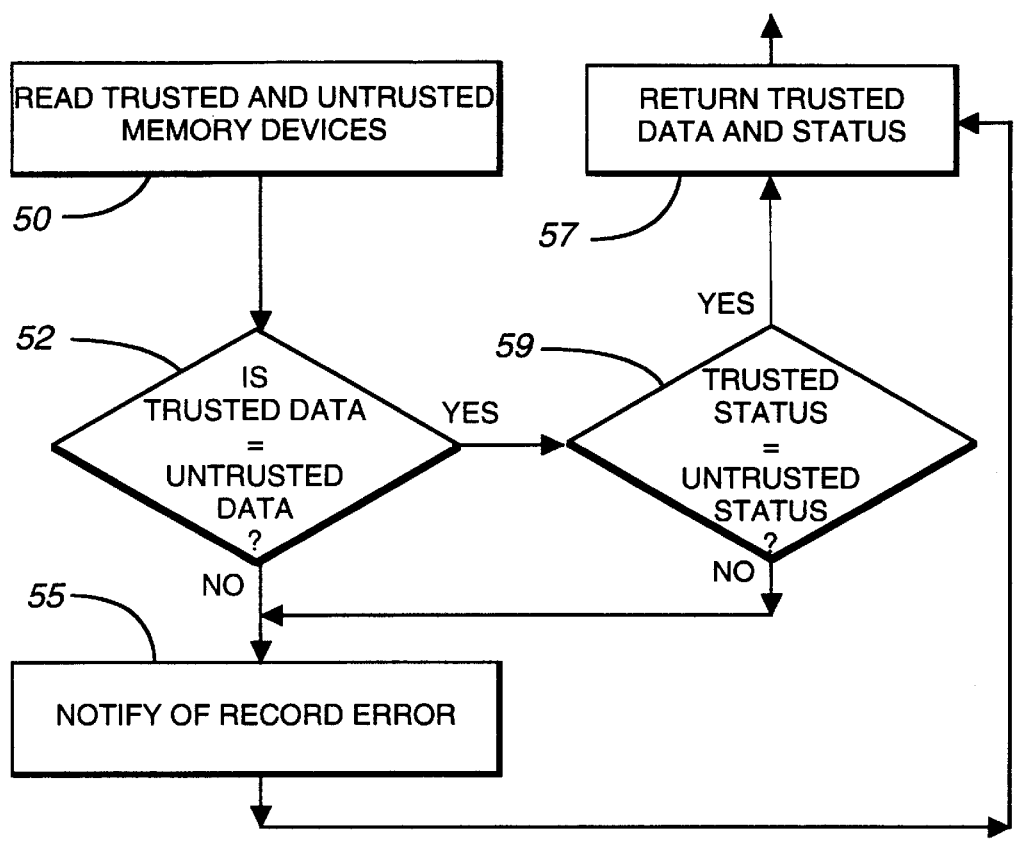
FIG. 4 is a software flow diagram showing the operation of a portion of a software implemented shadow driver device, between a computing system, a trusted memory device and an untrusted memory device, according to a preferred embodiment of the invention.

As indicated above, preferably the shadow driver device 21 is implemented by software programming. A typical flowchart of a software program that may be used to implement a read portion of a shadow driver of the type described herein is shown in FIG. 4. As shown, the first step 50 is to read the outputs of the trusted and untrusted memory devices. This would be done, for example, in response to a read request command from the workstation 22. The two outputs are then compared 52 to determine if they differ. If a difference is detected, indicating that the untrusted memory device is not accurately returning data, a notification of the record error is generated 55. The data from the trusted memory device 24 is then returned 57.

On the other hand, if the comparison between the data returned from the trusted memory device 24 and untrusted memory device 26 are the same, the status information returned from both the trusted memory device 24 and untrusted memory device 26 are compared 59. If the status information differs, then an error notification is generated 55 and the status information from the trusted memory device 24 is returned 57. If the status information is the same in the comparison 59, then the status information from the trusted memory device 24 is returned 57.

Figure 5:
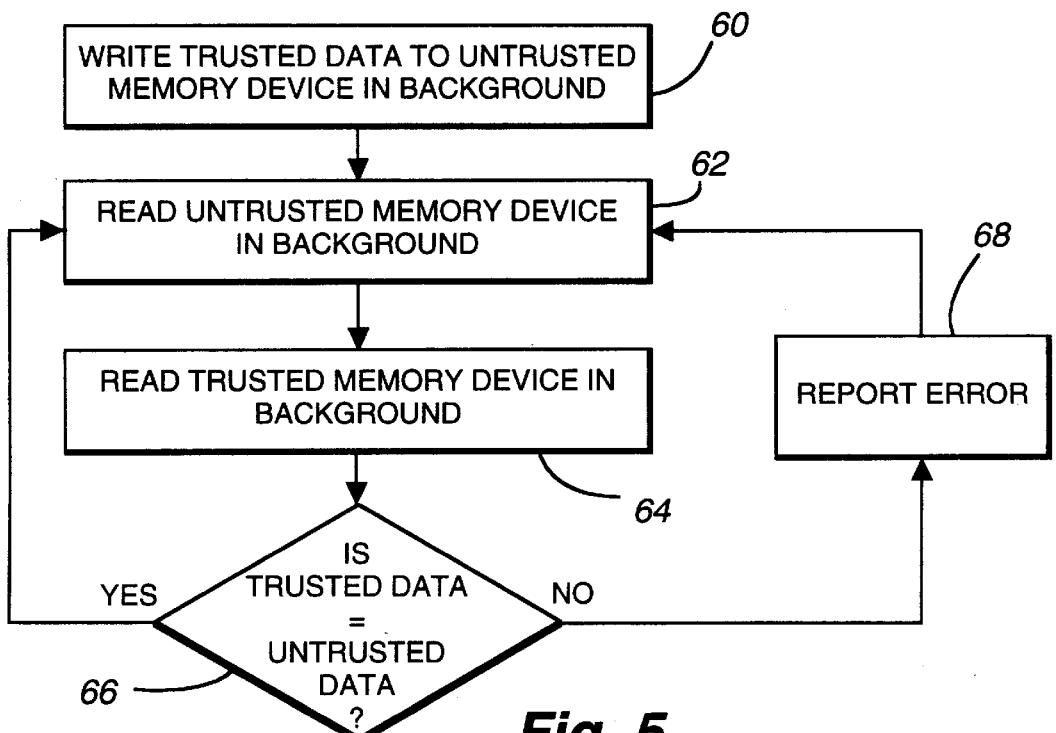
FIG. 5 is a software flow diagram showing the background comparison of trusted and untrusted data, according to a preferred embodiment of the invention.

A software flow diagram showing the steps by which a background comparison of trusted and untrusted data can be made, according to a preferred embodiment of the invention, is shown in FIG. 5. In order to detect conditions in which the untrusted device 26 may be corrupting data that is not being actively written or read by the workstation 22, a background test is performed that reads the entire contents of the untrusted device 22, or at least a predetermined portion thereof, and compares it to the contents of the trusted device or to a table of desired contents. Thus, initially data is read in the background from a trusted data source into all or a predetermined portion of the untrusted memory device 60. This is referred to a "silvering", metaphorically referring to the preparation of a silver layer on a mirror.

Subsequently, in the background, all or a predetermined portion of the data in the untrusted memory device is read 62. Trusted data is then also read 64, either from the trusted memory device or from a table of trusted data, and the two data are compared 66. If the data are the same, the read process 62 is continued to completion. On the other hand, if the data differ, an error is reported 68, and the read process 62 is continued to completion.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method of verifying operation of a new untrusted memory device that is added to a computer system having an existing trusted memory device, when said computer system, including said new untrusted memory device and said existing trusted memory device, is thereafter operated under load, the method comprising the steps of:

as said computer system operates under load, concurrently shadowing all write operations made to said existing trusted memory device to said new untrusted memory device;

as said computer system operates under load, responding to a read request by reading requested data from both said existing trusted memory device and said new untrusted memory device;

comparing said requested data read from said existing trusted memory device to said requested data read from said new untrusted memory device; and if said data comparing differs, returning said requested data read from said existing trusted memory device, and generating an error indication.

2. A method of verifying operation of a new and an untrusted memory device that is added to a computer system having an existing and a trusted memory device when said computer system, including said untrusted memory device and said trusted memory device, is thereafter operated under load, the method comprising the steps of:

as said computer system operates under load, providing for concurrently shadowing all write operations made to said trusted memory device to said untrusted memory device;

as said computer system operates under load, providing for responding to a read request by reading requested data from both said trusted memory device and said untrusted memory device;

providing for comparing said requested data read from said trusted memory device to said requested data read from said untrusted memory device; and if said data comparing differs, providing for returning said requested data read from said trusted memory device, and generating an error indication.

3. A method of operating a computing system having a preexisting and trusted memory device after a new and untrusted memory device has been added to said computing system, wherein, as said computing system thereafter operates in a normal load environment, said trusted and untrusted memory devices receive and return the same data values if said untrusted memory device is operating properly, the method comprising the steps of:

operating said computing system in said normal load environment;

performing a write operation directed to said trusted memory device by writing data to both said trusted and said untrusted memory device;

performing a read operation by concurrently reading data from both said trusted and said untrusted memory devices;

comparing said data read from said trusted and said untrusted memory devices during said performing a read operation step; and generating an error indication if said data read from said trusted and said untrusted memory devices during said performing a read operation step are not the same data value.

4. The method of claim 3 including the step of:

using said data read from said trusted memory device during said performing a read operation step in an operation of said computing system.

5. The method of claim 3 including the step of:

performing said write operation step prior to performing said read operation step.

6. The method of claim 3 including the steps of:

applying a control signal to said trusted memory device and to said untrusted memory device;

in response to said applying a control signal step, returning a status signal from each of said trusted memory device and said untrusted memory device;

comparing said status signal returned from said trusted memory device to said status signal returned from said untrusted memory device; and generating an error indication if said status signal returned from said trusted memory device differs from said status signal returned from said untrusted memory device.

7. The method of claim 6 including the step of:

using said data read from said trusted memory device during said performing a read operation step in an operation of said computing system.

8. A method of operating a computing system having a preexisting and trusted memory device after a new and untrusted memory device has been added to said computing system, wherein, as said computing system thereafter operates in a normal load environment, said trusted and untrusted memory devices receive and return a same data value if said untrusted memory device is operating properly, the method comprising the steps of:

operating said computing system in said normal load environment;

performing a write operation directed to said trusted memory device by writing data to both said trusted and said untrusted memory device; and performing a background test by reading a predetermined content of each of said trusted and said untrusted memory device, comparing said two read predetermined contents, and generating an error indication if said two read predetermined contents differ.

9. A computer program product for use in verifying a desired operation of a new and an untrusted memory device that is added to a computer having an existing and a trusted memory device when said computer, including said untrusted memory device and said trusted memory device, is thereafter operated under load, the computer program product comprising a computer usable medium having:

computer readable program code devices configured to cause a computer operating under load to effect concurrently shadowing all write operations to said trusted memory device to said untrusted memory device;

computer readable program code devices configured to cause a computer operating under load to effect responding to a read request by reading requested data from both said trusted memory device and said untrusted memory device; and computer readable program code devices configured to cause a computer operating under load to effect comparing said requested data read from said trusted memory device to said requested data read from said untrusted memory devices; and computer readable program code devices configured to cause a computer operating under load to effect generating an error indication if said requested data read from said trusted memory device differs from said requested data read from said untrusted memory devices.

10. The computer usable medium of claim 9 including:

computer readable program code devices configured to cause a computer operating under load to effect applying control signals to said trusted memory device and to said untrusted memory device;

computer readable program code devices configured to cause a computer operating under load to effect returning a status signal from each of said trusted memory device and said untrusted memory device in response to said control signals;

computer readable program code devices configured to cause a computer operating under load to effect comparing said status signal returned from said trusted memory device to said status signal returned from said untrusted memory device; and computer readable program code devices configured to cause a computer operating under load to effect generating an error indication if said status signal returned from said trusted memory device differs from said status signal returned from said untrusted memory device.

11. The computer usable medium of claim 9 including:

computer readable program code devices configured to cause a computer operating under load to effect using data read from said trusted memory device during operation of said computer.

12. The computer usable medium of claim 9 including:

computer readable program code devices configured to cause a computer operating under load to effect a background test by reading predetermined contents of said untested memory device, comparing said read predetermined contents with a desired predetermined contents, and generating an error indication if said read predetermined contents and said desired predetermined contents are different.

13. In a computer system that contains a preexisting trusted memory device and a new untrusted memory device, apparatus for checking operation of said new untrusted memory device as said computer system, including both said preexisting trusted memory device and said new untrusted memory device, operates in a normal operating environment, comprising:

a workstation generating read and write requests to said preexisting trusted memory device;

a shadowing device interposed between said workstation and said preexisting trusted and said new untrusted memory devices;

said shadowing device operating to concurrently duplicate all read and write operations to said preexisting trusted and said new untrusted memory devices;

a comparator for comparing data returned from said preexisting trusted memory device to data returned from said new untrusted memory device in response to said read operations, and for generating an error signal if said data returned from said preexisting trusted memory device and said new untrusted memory device differ; and an error reporter operable to report an error in response to said error signal, and to return said data returned from said preexisting trusted memory device for use in said computer system.

14. The apparatus of claim 13 wherein said shadowing device includes:

a write driver to concurrently duplicate all write operations to said preexisting trusted and said new untrusted memory devices; and a read driver to concurrently duplicate all read operations from said preexisting trusted and said new untrusted memory devices.

15. The apparatus of claim 13 wherein said shadowing device includes:

a control signal driver to concurrently deliver a control signal to said preexisting trusted memory device and said new untrusted memory device, whereupon a status signal is returned from each of said preexisting trusted memory device and said new untrusted memory device;

a status comparator receiving said status signal returned from said preexisting trusted memory device and said status signal returned from said new untrusted memory device; and an error reporter reporting an error indication if said status signal returned from said trusted memory device differs from said status signal returned from said untrusted memory device, and returning said status signal from said preexisting trusted memory device for use in said computer system.

16. The apparatus of claim 13 said shadowing device includes:

a content checker for performing a background test by reading predetermined contents of said new untested memory device, comparing said read predetermined contents with a desired predetermined contents, and generating an error indication if said read predetermined contents and said desired predetermined contents are different.

* * * * *